(12) United States Patent
Adachi et al.

(10) Patent No.: US 10,384,583 B2
(45) Date of Patent: Aug. 20, 2019

(54) ASSIST GRIP

(71) Applicant: NIFCO INC., Yokosuka-shi, Kanagawa (JP)

(72) Inventors: Takefumi Adachi, Machida (JP); Ryuhei Nishida, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 15/737,585

(22) PCT Filed: Jun. 16, 2016

(86) PCT No.: PCT/JP2016/067938
§ 371 (c)(1),
(2) Date: Dec. 18, 2017

(87) PCT Pub. No.: WO2016/204229
PCT Pub. Date: Dec. 22, 2016

(65) Prior Publication Data
US 2018/0154814 A1 Jun. 7, 2018

(30) Foreign Application Priority Data
Jun. 18, 2015 (JP) .................................. 2015-122737

(51) Int. Cl.
*B60N 3/02* (2006.01)

(52) U.S. Cl.
CPC ............... *B60N 3/023* (2013.01); *B60N 3/02* (2013.01); *B60N 3/026* (2013.01)

(58) Field of Classification Search
CPC .................................. B60N 3/02; B60N 3/026
(Continued)

(56) References Cited

U.S. PATENT DOCUMENTS

| 4,673,625 A | 6/1987 | McCartney et al. |
| 8,661,622 B2 | 3/2014 | Takai et al. |

(Continued)

FOREIGN PATENT DOCUMENTS

| EP | 0 743 225 A2 | 11/1996 |
| JP | 2003-276492 A | 9/2003 |

(Continued)

OTHER PUBLICATIONS

PCT/ISA/210, "International Search Report for International Application No. PCT/JP2016/067938," Sep. 20, 2016.

(Continued)

*Primary Examiner* — Jason S Morrow
(74) *Attorney, Agent, or Firm* — Manabu Kanesaka

(57) ABSTRACT

An assist grip includes a retainer having a secured part secured to an attachment surface, and a pair of shaft-supporting parts; and a grip body that has a pair of recessed parts provided at both ends, a guide groove through which the shaft-supporting parts can slide and which is formed in at least one of two inside surfaces facing each other, and bearing holes provided in both inside surfaces; the grip body being turned about the shaft-supporting parts as a fulcrum to switch between a storage position and a usage position. The guide groove extends from the open edges of the recessed parts toward the inner bottom surface, and at least one bearing hole of both inside surfaces has an elastic locking piece positioned in a bearing hole or in the terminal end of the guide groove, the piece matingly or retainingly locking an end part of a shaft-supporting part.

5 Claims, 13 Drawing Sheets

(58) Field of Classification Search
USPC .......................................................... 296/1.02
See application file for complete search history.

(56) References Cited

U.S. PATENT DOCUMENTS

| | | |
|---|---|---|
| 2005/0091798 A1 | 5/2005 | Belchine, III et al. |
| 2012/0222360 A1* | 9/2012 | Schryer .................. B60N 3/026 |
| | | 49/460 |
| 2016/0236602 A1 | 8/2016 | Nagayama |
| 2018/0186264 A1* | 7/2018 | Brown .................... B60N 3/026 |

FOREIGN PATENT DOCUMENTS

| | | |
|---|---|---|
| JP | 2005-138823 A | 6/2005 |
| JP | 2010-116031 A | 5/2010 |
| JP | 4662746 B2 | 3/2011 |
| JP | 2015-085727 A | 5/2015 |
| WO | 2011/142475 A1 | 11/2011 |

OTHER PUBLICATIONS

Korea Patent Office, "Office Action for Korean Patent Application No. 10-2016-0063596," Jun. 15, 2017.
Europe Patent Office, "Search Report for European Patent Application No. 16811703.4," Jan. 28, 2019.

* cited by examiner

ASSIST GRIP

TECHNICAL FIELD

The present invention relates, in particular, to an assist grip, in which a grip main body is rotatably supported by a retainer fixed to amounting surface of a panel and the like, and is switched between a storage position at which the grip main body is placed along the mounting surface and a use position at which the grip main body protrudes from the mounting surface.

BACKGROUND ART

FIGS. 12(a) and 12(b) show an assist grip disclosed in Patent Literature 1. FIG. 12(a) shows a cross-sectional view of a first end side of a grip main body at a use position of a grip main body. FIG. 12(b) shows one of recessed sections for storage provided on both ends of the grip main body, and shows both inner surfaces 7 and 8 that face each other in a longitudinal direction among inner circumferential surfaces of the recessed section. The assist grip includes a pair of recessed sections 12 provided at both ends of the grip main body 1, and guide grooves 38 and 39 provided on both of the inner surfaces 7 and 8 that face each other in a longitudinal direction of the recessed sections 12. Each of the recessed sections 12 is attached with a retainer (mounting stage) 3. The retainer 3 includes a fixed section 17 fixed to a mounting surface of a panel P and a support pin 29 that is a journaling section disposed in the recessed sections 12 and slidably fitted to the guide grooves 38 and 39. The guide grooves 38 and 39 are horizontally symmetrical, and include bearing holes 14 and 15 that are provided to communicate with groove terminals and fitted to corresponding ends of the support pin 29, and protruding sections 41 and 42 protruding into the grooves close to the bearing holes 14 and 15. When the retainer is connected to the grip main body, both ends of the support pin 29 are slid from opening edges of the recessed section to the bearing holes 14 and 15 along the corresponding guide grooves 38 and 39, so as to be fitted into the bearing holes 14 and 15 (paragraph 0042).

FIG. 13 shows another structure of the above assist grip disclosed in Patent Literature 2, and shows a relationship between one of recessed sections (space) 18 provided on both ends of a grip main body (handle) 12 and a retainer (hinge) 14. In this structure, the recessed section 18 includes a guide groove (track) 22 formed on both inner surfaces that face each other in a longitudinal direction and a bearing hole (hole) 20 provided to communicate with a groove terminal of each of the guide grooves 22. The retainer 14 is attached to the recessed section 18. The retainer 14 includes a tab 24 fixed to a mounting surface of a panel and the like, a pair of mounting support members 38 provided on an opposite side of the tab 24, bosses 44 provided on outer surfaces of the mounting support members 38 and slidably fitted to the corresponding guide grooves 22, a track and a mounting hole (not shown) provided on an inner surface of a first one of the mounting support members 38 and fitted to a boss 60 provided on a first end of a damper 40, and a slot 50 provided on an inner surface of a second one of the mounting support members 38 and fitted to a lip (not shown) provided on a second end of the damper 40. The retainer 14 is rotatably connected to the recessed section 18 after each of the bosses 44 is slid along the corresponding guide groove 22 and finally fitted to the bearing hole 20. After that, both the mounting support members 38 are prevented from swinging to an inner side by the damper 40 arranged between them, so as to prevent removal from the bearing hole 20.

CITATION LIST

Patent Literature

Patent Literature 1: JP 2003-276492 A
Patent Literature 2: JP 4662746 B2

SUMMARY OF INVENTION

Technical Problem

In each of the above structures, Literature 1 includes the guide groove communicating with each of the bearing holes, and both ends of the support pin are fitted to the bearing holes from the corresponding guide grooves. Similarly, Literature 2 includes the guide groove communicating with each of the bearing holes, and the bosses of both of the mounting members are fitted to the bearing holes from the corresponding guide grooves. For this reason, fitting operation is easier to perform in both Literatures as compared to a case where there is no guide groove; however, problems described below are found.

That is, in the structures shown in Literatures 1 and 2, both ends of the support pin or the bosses on both sides are moved at the same time along the corresponding guide grooves. However, when moved in a manner biased on the left or right, the ends of the support pin or the bosses locally hit inner surfaces that form the guide grooves, and cannot be slid to the bearing hole in an excellent manner. With respect to this point, normal operation cannot be maintained, particularly in automatic assembly using a robot and the like. The support pin of Literature 1 has both ends fitted to the bearing hole by crushing the protruding sections that protrude into the grooves. Accordingly, an excessive load is required for passing over the protruding sections, and operability is also poor in this respect.

An object of the present invention is to improve assemble ability by allowing a pair of journaling sections to slide from introduction grooves of guide grooves to terminals in a stable manner, and allowing a pair of journaling sections to be easily fitted to corresponding bearing holes (including terminals of the guide grooves). Other objects are to be made clear in the description of the content described below.

Solution to Problem

To achieve the above object, according to a first aspect of the present invention, there is provided an assist grip that includes a fixed section fixed to amounting surface of a panel and the like, a retainer including a pair of journaling sections, a pair of recessed sections provided on both ends in a longitudinal direction, a guide groove formed at least on either one of inner surfaces facing each other in a longitudinal direction among inner surfaces of the recessed section, the guide groove on which the journaling section can slide, and a grip main body including bearing holes provided on a coaxial line on both of the inner surfaces. The grip main body is rotated with the journaling section used as a fulcrum so as to be able to switch between a storage position along the mounting surface and a use position protruding from the mounting surface. The guide groove extends from an opening edge of the recessed section to an inner bottom surface side, and at least one of the bearing holes on both of the inner surfaces includes an elastic locking piece that is positioned at a terminal of the guide groove or the bearing hole and allows fitting of or locks an end section of the journaling section.

According to a second aspect of the present invention, in place of the configuration of the guide groove that extends from an opening edge of the recessed section to an inner bottom surface side, and at least one of the bearing holes on both of the inner surfaces includes an elastic locking piece that is positioned at a terminal of the guide groove or the bearing hole and allows fitting of or locks an end section of the journaling section in the assist grip according to the first aspect of the present invention, the bearing hole has a configuration of being provided to be connected to the terminal of the guide groove, a configuration of including an elastic locking piece that is positioned at the terminal of the guide groove or the bearing hole and allows fitting of or locks an end section of the journaling section, and a configuration of being provided irrespective of the guide groove. When the retainer is mounted on the grip main body, a width between both of the inner surfaces is widened by insertion of the journaling section corresponding to the guide groove formed at least on either one of the inner surfaces, and each of the journaling sections is fitted to a corresponding one of the bearing holes.

In the present invention described above, the "mounting surface of a panel and the like" includes an outer panel and an inner panel constituting a body panel of a vehicle body, inner materials like a ceiling trim mounted on the panels, and also members similar to the above.

The present invention described above is more preferably embodied in forms described below.

(a) In the assist grip according to the first aspect of the present invention, the elastic locking piece includes a claw that protrudes from a front end and prevents removal, and the claw can be switched between a fitting state and a fitting release state with swinging of the locking piece. According to this form, the elastic locking piece includes a claw that protrudes from a front end and prevents removal, and the claw is switched from the fitting state and the fitting release state with swinging of the elastic locking piece. This ensures obtaining of functions and effects of the assist grip according to the first aspect of the present invention.

(b) In the assist grip according to the first aspect of the present invention or the form of the above (a), the elastic locking piece is formed by a slit-like empty section on part of a wall section that forms a section around a terminal of the guide groove and/or the bearing hole, and configured to be swingable to the slit-like empty side. According to this form, the elastic locking piece is formed by the slit-like empty section on part of a wall section that forms a section around the terminal of the guide groove and/or the bearing, and can be implemented with a simple configuration.

(c) In the form of the above (a), there is established a relationship of A<B<C, where A is a groove width minimum dimension obtained by subtracting a protruding amount of the claw from a groove width of the guide groove, B is a diameter dimension of an end section of the journaling section, and C is a groove width dimension of the guide groove. According to this form, there is established a relationship of A<B<C, where A is a groove width minimum dimension obtained by subtracting a protruding amount of the claw from a groove width of the guide groove, B is a diameter dimension of the journaling section, and C is a groove width dimension of the guide groove. This configuration is most preferable for the journaling section to be engaged with the elastic locking piece by sliding on the guide groove.

(d) The assist grip according to the first and second aspects of the present invention includes, at a storage position of the clip main body, an introduction groove extending from an opening edge of the recessed section to the inner bottom surface side and a terminal on a front end side of the introduction groove, and, at the use position of the grip main body, a load applied to the journaling section is received by the terminal of the guide groove in a substantially horizontal state and/or the bearing hole. According to this form, particularly in the use position of the grip main body, a large load applied to the journaling section is received by the terminal of the guide groove and/or the bearing hole. Accordingly, load bearing can be improved.

Advantageous Effects of Invention

In the assist grip according to the first aspect of the present invention, in particular, in the guide groove, at least one of the bearing holes on both inner surfaces includes an elastic locking piece that is positioned at a terminal of the guide groove or the bearing hole and allows fitting of or locks an end section of the journaling section. Even when the journaling sections on both sides of the retainer are operated to slide in a manner biased on the left or right during a process of being slid from an entrance or an introduction groove of the guide groove to a terminal, the elastic locking piece itself elastically swings, and distributes and absorbs local stress, so that excellent sliding of the journaling member can be easily maintained. In this manner, assemble ability can be improved, and a pivotal support structure in which the end section of the journaling section is locked and not easily removed can be achieved. The elastic locking piece is formed together with a bearing hole deeper than the guide groove after the bearing hole is formed at a terminal of the guide groove.

In the assist grip according to the second aspect of the present invention, the bearing hole has any of a configuration in which the bearing hole is formed as a hole or a recess connected to a terminal of the guide groove, a configuration in which the elastic locking piece is added to the above configuration, a configuration in which the bearing hole is positioned at the terminal of the guide groove and formed by the elastic locking piece, and a configuration in which the bearing hole is formed as a hole or a recessed section irrespective of the guide groove. In the present invention, when the retainer is mounted on the grip main body in an operation of mounting the retainer to the grip main body, a width between both inner surfaces is widened by inserting the journaling section corresponding to the guide groove formed at least on either one of the inner surfaces, and each of the journaling sections is fitted to the corresponding bearing hole. In this structure, assemble ability can be improved by setting a thickness of an inner surface on which the recessed section is formed or with a simple configuration in which an underfill section of the guide groove is provided.

BRIEF DESCRIPTION OF DRAWINGS

FIGS. 2(a) to 2(c) show detailed sections of the assist grip, in which FIG. 2(a) shows a front view of the assist grip at a storage position, FIG. 2(b) is a rear view, and FIG. 2(c) is a cross-sectional view cut along line B-B of FIG. 2(a).

FIGS. 4(a) to 4(c) show a grip main body constituting the assist grip, in which FIG. 4(a) is a rear view, FIG. 4(b) is a diagram viewed from a Y direction of FIG. 4(a), and FIG. 4(c) is a cross-sectional view cut along line C-C of FIG. 4(a).

DESCRIPTION OF EMBODIMENTS

Figure 1A:
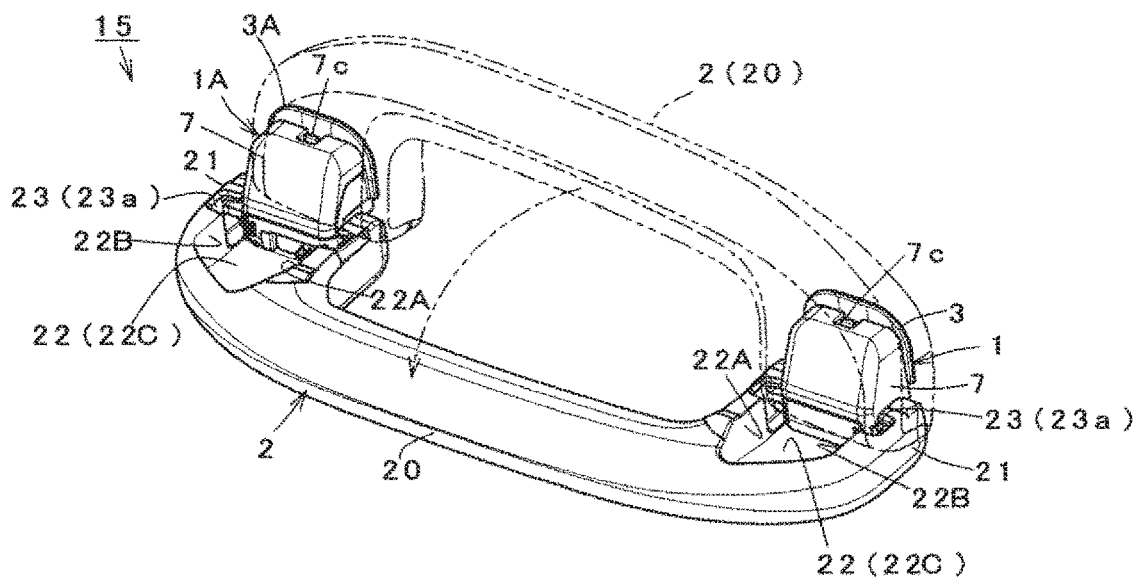
FIG. 1(a) is a schematic diagram showing a use state of an assist grip in a first form.

Hereinafter, description will be made on embodiments of the present invention with reference to the drawings. In the description, a basic structure of an assist grip will be clarified. After that, detailed description will be made on important sections and their functions of a first form of the assist grip according to first and second aspects of the present invention, first, second, and third variations, important sections and their functions of a second form of the assist grip according to a second aspect of the present invention, and a fourth variation in this order.

(Basic Structure)

In FIGS. 1(a) to 3(b), an assist grip 15 comprises retainers 1 and 1A mounted on a vehicle body side, and a grip main body 2 rotatably connected to and held by the retainers 1 and 1A with a pivot 36 which is a journaling section. The retainers 1 and 1A include a holding member 3 or 3A, a metal clip 4 and a cover 7 attached to the holding members 3 and 3A, a twisted coil spring 5 which is arranged in a storage section 35 provided in the holding member 3 and energizes one of the retainer 1 and the grip main body 2 to rotate relatively to the other, and a damper 6 arranged in a storage section 35a provided in the holding member 3A and brakes rotation speed of the grip main body 2. The grip main body 2, the holding members 3A and 3B, and the cover 7 are resin molded products, but they may be made from other materials.

The grip main body 2 is a gripping section 20 gripped with a hand at an intermediate section having a substantially U-shape. Both ends 21 in a longitudinal direction of the grip main body 2 have a recessed section 22 which is formed to have an opening on a back side. Each of the recessed sections 22 has a size corresponding to the holding members 3 and 3A, and includes guide grooves 23 provided horizontally symmetrically on an inner surface 22A on an inner side and an inner surface 22B on an outer side which face each other in a longitudinal direction. A first one of the recessed section 22 in which the holding member 3 is arranged is provided with a spring locking hole 22a. A second one of the recessed sections 22 in which the holding member 3A is arranged is provided with step sections 22b and 22c (see FIG. 3(a)) abutting onto part of the damper 6, that is, projection sections 8b and 8c on an outer cylinder described later.

Figure 5A:
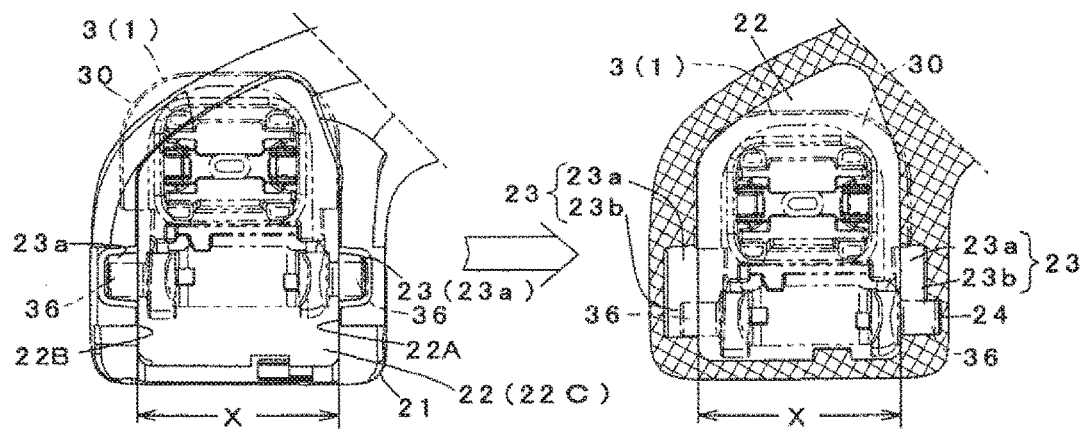
FIG. 5(a) is a schematic diagram showing a relationship between a first recessed section of the grip main body and a retainer, in which the left side shows a portion enclosed by a chain double-dashed line and attached with a reference sign a in FIG. 4(a), and the right side shows a cross-sectional view cut along line D-D in FIG. 4(b).
Figure 5B:
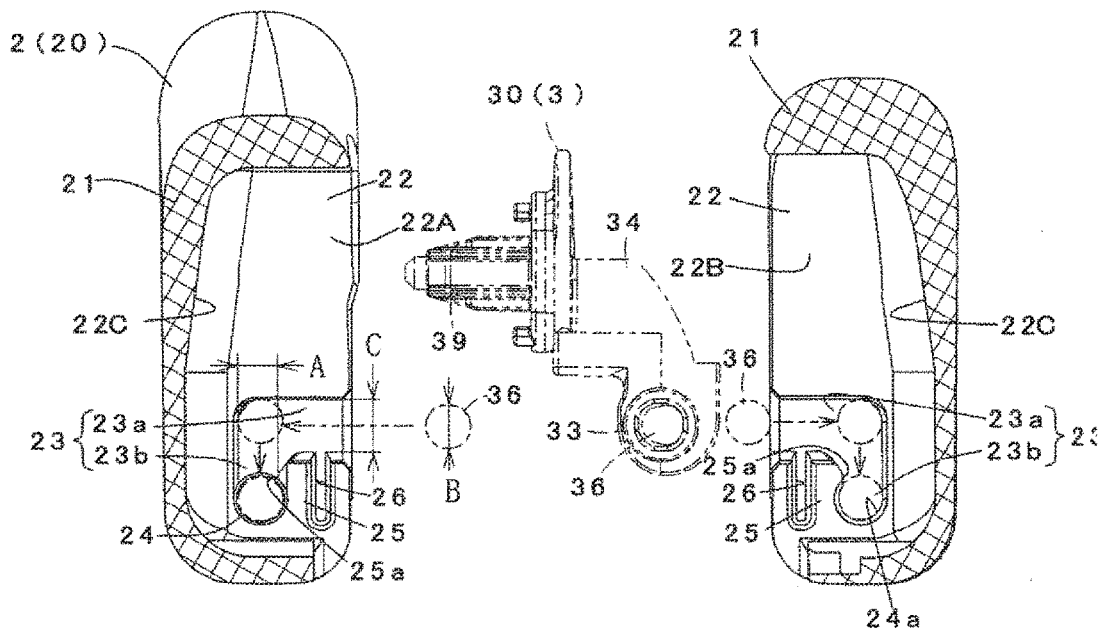
FIG. 5(b) is a schematic diagram showing a relationship between the guide grooves on both inner surfaces of the first recessed section and each pivot of the retainer, in which the left side shows a cross-sectional view cut along line F-F of FIG. 4(a) and the right side shows a cross-sectional view cut along line E-E of FIG. 4(a).

Each of the guide grooves 23 has a substantially inverted L-shape as shown in FIG. 5(b), and includes an introduction groove 23a extending from an opening edge of the recessed section to an inner bottom surface 22C side in the recessed section, and a terminal 23b positioned in a location bent from the guide groove 23a. The inner surface 22A is provided with a bearing hole 24 connected to the terminal 23b of the guide groove. In contrast, the guide groove 23 on the inner surface 22B has the terminal 23b formed as a bearing hole 24a at a location formed by an elastic locking piece 25 described later.

Figure 3A:
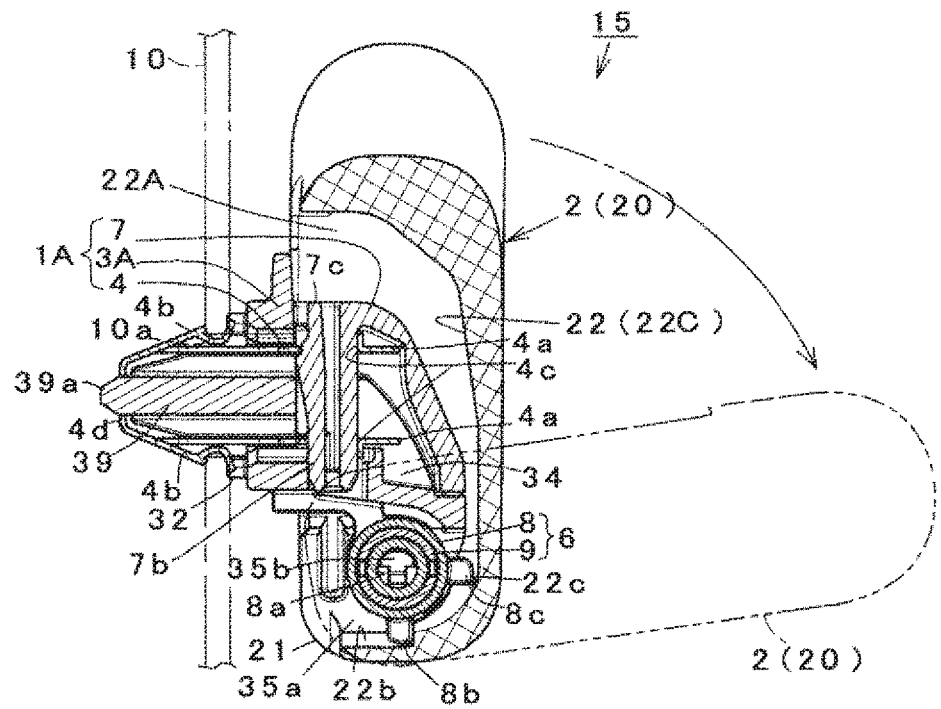
FIGS. 3(a) and 3(b) are a cross-sectional view cut along line A-A and a cross-sectional view cut along line A1-A1 of FIG. 2(a).
Figure 3B:
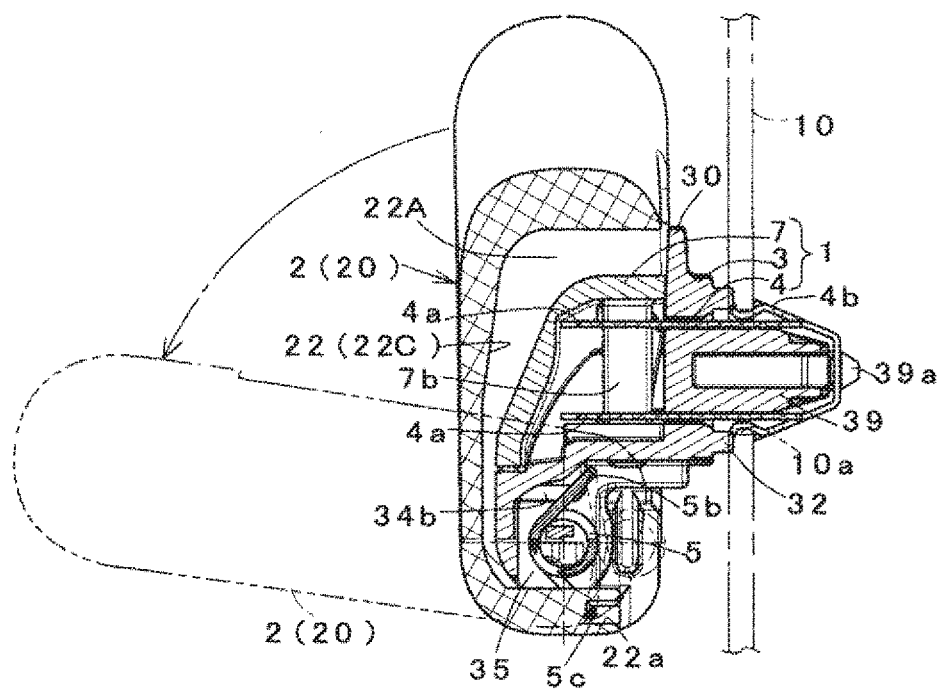
Figure 4A:
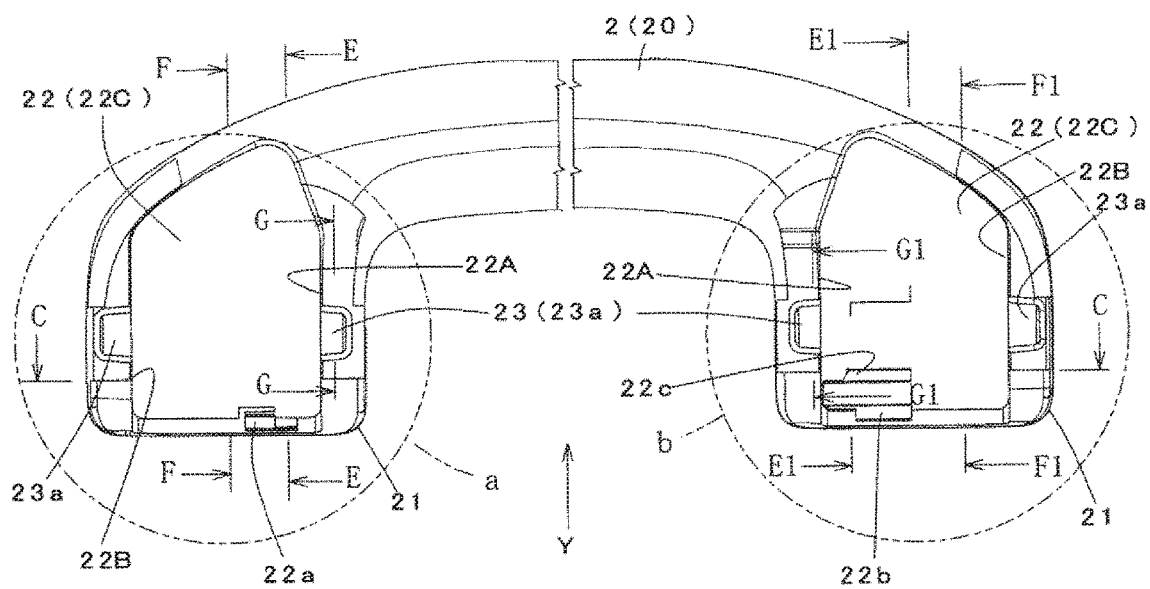
Figure 4B:
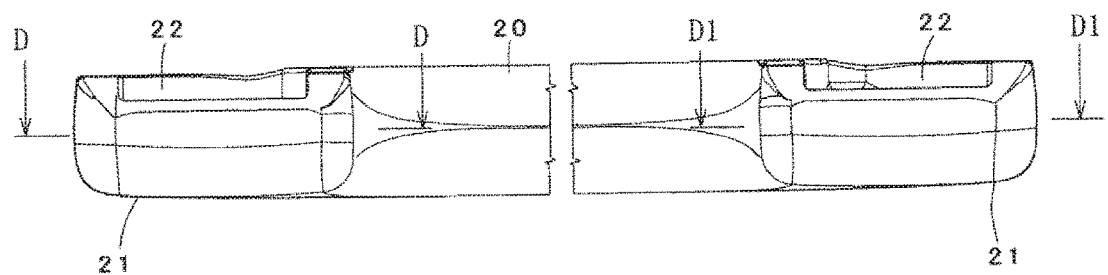
Figure 4C:
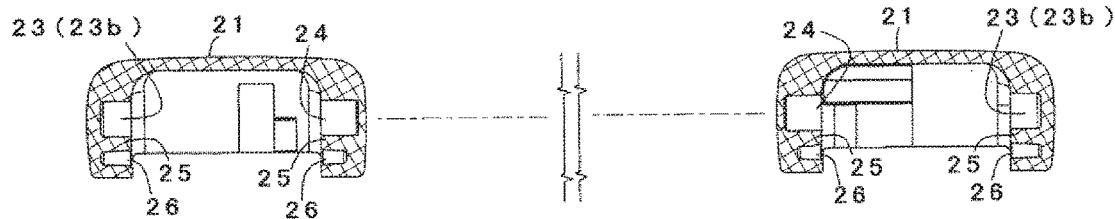

The retainers 1 and 1A are mounted on an mounting hole 10a provided on a body panel 10 with a clip 4 inserted between them as shown in FIGS. 3(a) and 3(b) in a state where the retainers 1 and 1A are connected to the recessed sections 22 of the grip main body 2 described above. In this case, the body panel 10 is covered with a ceiling trim (not shown), and the retainers 1 and 1A are arranged on the ceiling trim. In the retainer 1, the twisted coil spring 5 is arranged in the storage section 35 provided in the holding member 3. In the retainer 1A, the damper 6 is arranged in the storage section 35a provided in the holding member 3a. The retainers 1 and 1A, or the holding members 3 and 3A, have substantially the same shape except the storage sections 35 and 35a.

The twisted coil spring 5 has abutting sections 5b and 5c formed to extend in both end sections 5a having a coil shape as shown in FIGS. 1(b) and 2(a) to 2(c). As shown in FIGS. 1(a) to 3(b), the damper 6 is formed with an outer cylinder 8 that forms a cross-sectional circular space inside the thickness and an inner cylinder 9 rotatably fitted to the circular space in a state of containing a fluid. The outer cylinder 8 includes an opening 8a on an one end side, and projection sections 8b and 8c (see FIG. 2(c)) which are provided in two locations on an outer periphery and engaged with step sections 22b and 22c so as to be able to rotate in a manner integral with the grip main body 2. The inner cylinder 9 includes a projecting closed end section 9a.

The holding members 3 and 3A include a board 30 having a substantially rectangular shape arranged approximately in the middle vertically, a support section 34 protruding upward from the board 30, and a substantially tongue-shaped leg section 39 projecting downward from the board 30. The holding members 3 and 3A also include the metal clip 4 arranged from the leg section 39 (see FIGS. 3(a) and 3(b)) to an inner side of the support section 34, and a cover 7 mounted to cover the inner side of the support section 34.

Figure 1B:
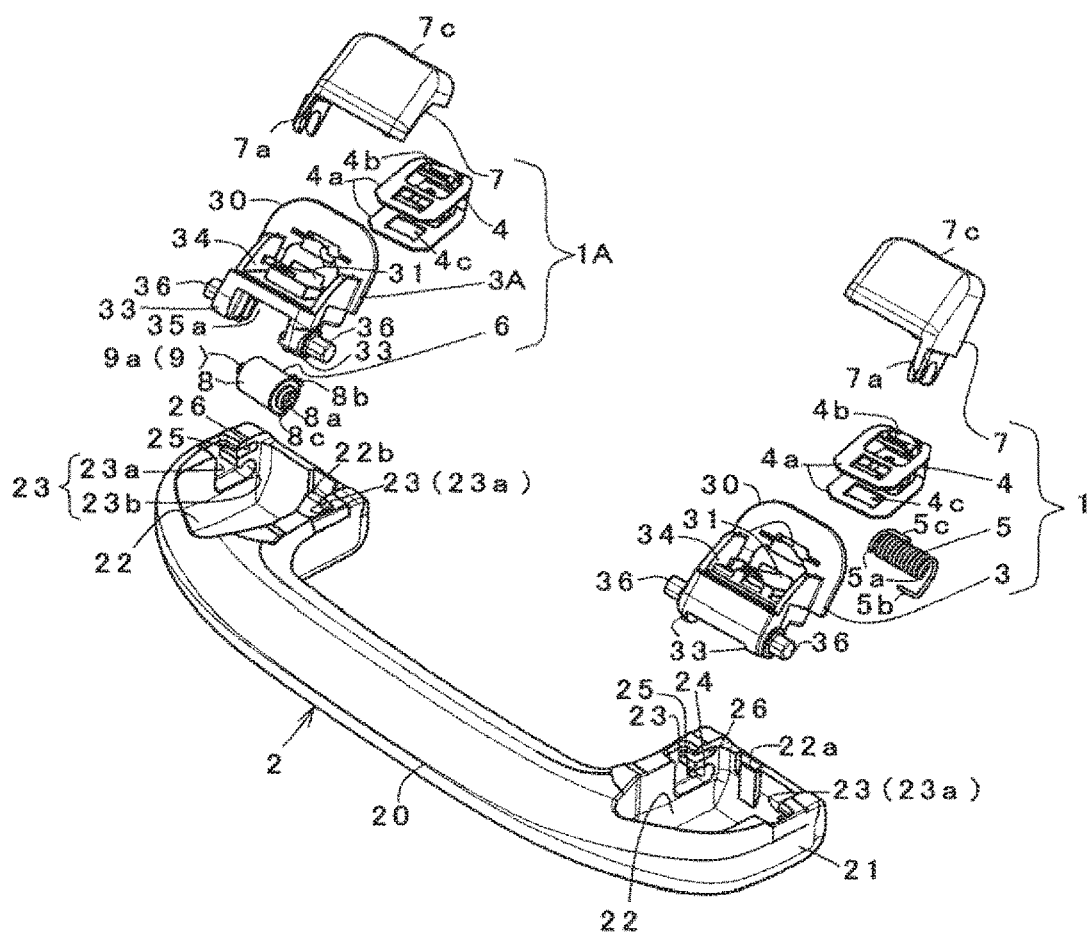
FIG. 1(b) is a schematic exploded diagram of the assist grip.

Among the above sections, the board 30 has two through-holes 31 which are formed to pass through the board 30 vertically (see FIG. 1(b)). Each of the through-holes 31 is a rectangular opening provided in an intermediate section in a horizontal direction, and has slits (not shown) provided on both sides of the opening. Projection sections 32 are provided in four corners on a lower surface of the board 30. The leg section 39 includes a protrusion 39a protruding from a protruding end surface.

Figure 2A:
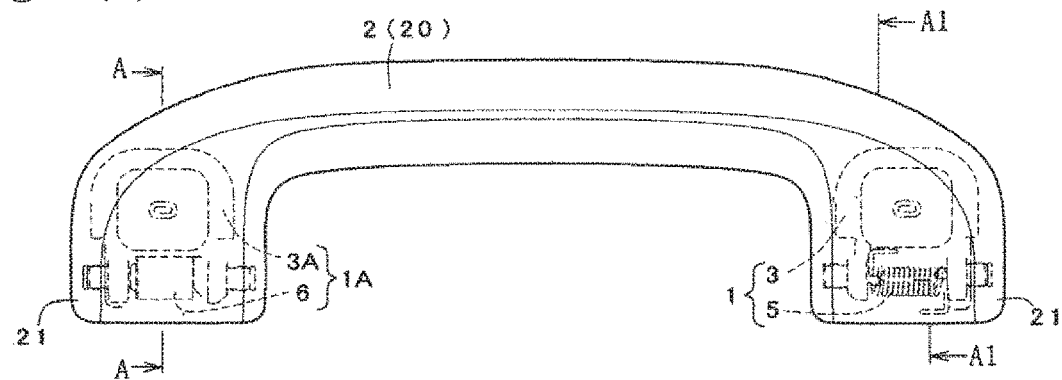
Figure 2B:
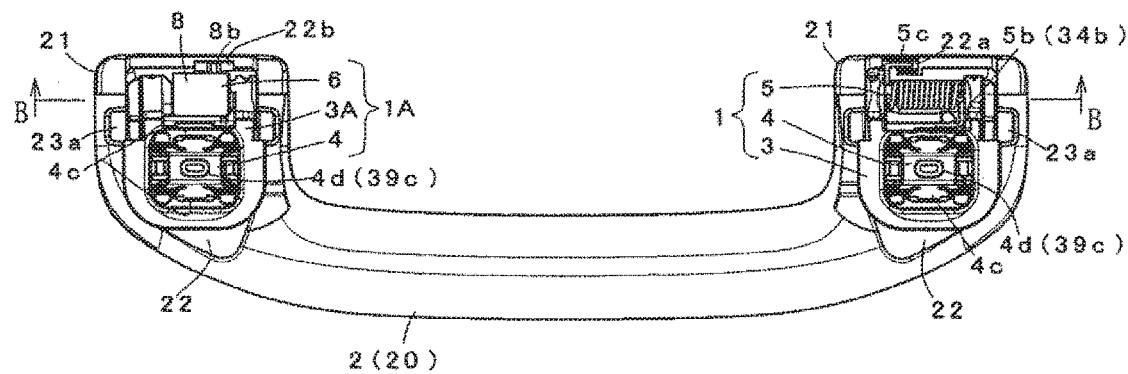
Figure 2C:
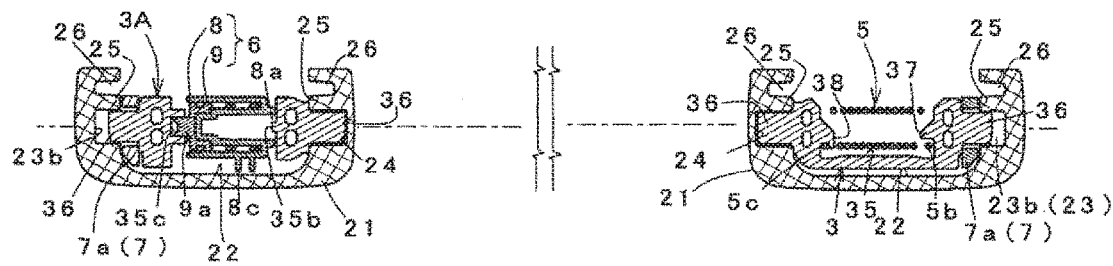

The support section 34 includes an engaging hole (not shown) opened in a center section, overhanging sections 33 overhanging backwards from both upper sides, a twisted coil spring storage section 35 or a damper storage section 35a formed between both the overhanging sections 33, a pivot 36 which is a journaling section protruding onto a coaxial line shown by a dashed line in FIG. 2(c) on an outer surface of each of the overhanging sections 33, spring holding protruding sections 37 and 38 protruding from an inner surface of each of the overhanging sections 33 which divides for the storage section 35, and damper connection sections 35b and 35c (see FIG. 2(c)) projecting from an inner surface of each of the overhanging sections 33 that form the storage section 35a. The connection section 35b has a substantially convex shape. The opening 8a on one end side of the outer cylinder is rotatably engaged with the connection section 35b. The connection section 35c has a substantially concave shape. A closed end section 9a of the inner cylinder is non-rotatably engaged with the connection section 35c.

Next, a structure of incorporating the clip 4 and the cover 7 into the holding members 3 and 3A will be clarified. The clip 4 has a substantially U-shape as shown in FIG. 1(b), and is formed with plate sections 4a facing each other and an intermediate section that connects both the plate sections 4a. Each of the plate sections 4a is provided with an elastic engaging claw 4b which is formed by a substantially U-shaped slit in a lower side location and latch holes 4c which are opened and face each other on the upper side. The intermediate section is provided with an engaging hole 4c (see FIG. 2(b)) engaged with the protrusion 39a. The above clip 4 is assembled with the holding members 3 and 3A with the leg section 39 inserted between the plate sections 4a and the protrusion 39a engaged with the engaging hole 4c. In an assembly state, each of the engaging claws 4b is arranged on front and rear surfaces of the leg section 39, and each of the plate sections 4a is inserted in the corresponding through-hole 31 and a front end side of the plate section protrudes into inner space of the support section 34.

As shown in FIGS. 1(b), 3(a), and 3(b), the cover 7 has a shape of covering an inner space of the support section 34. The cover 7 includes a mounting piece section 7a protruding below a side surface of one side, and a locking arm section 7b that protrudes to an inner lower side and is inserted into the hole 4c of each of the plate sections on the clip side. The mounting piece section 7a has a recessed section provided on a lower end side engaged with the corresponding pivot 36, so that the cover 7 can be mounted on the holding members 3 and 3A. The locking arm section 7b has a vertical cross-section formed in a frame shape, and has one side of the frame shape formed to be swingable by slits provided on both sides. That is, the one side of the frame shape is elastically engaged with an edge section of the hole 4c of the plate section, and has a swinging end 7c extending to an upper surface of the cover as shown in FIG. 3(a) enabling releasing operation using a tool, like a driver. The cover 7 is mounted on the support section 34 with the locking arm section 7b pressed against the hole 4c and the mounting piece section 7a engaging the recessed section with the corresponding pivot 36. In this mounting state, the clip 4 is prevented from being removed by the locking arm section 7b which is inserted through the holes 4c of the plate sections sequentially. The cover 7 is removed when the swinging end 7c is pressed and the cover 7 is moved in a direction away from the support section 34.

The storage section 35 is formed in a substantially L-shape between the overhanging sections 33. A rib 34b is provided on a vertical wall surface having an L shape on the side closer to the protruding section 37. The rib 34b is a location that locks a first one of the abutting sections 5b of the twisted coil spring 5. The pivot 36 and the protruding sections 37 and 38 are placed approximately on a rotating axis line as shown in FIG. 2(c). The twisted coil spring 5 has both the end sections 5a held around an axis of the corresponding protruding sections 37 and 38, and then a first one of the abutting sections 5b is engaged with the rib 34b, and a second one of the abutting sections 5c is engaged with the locking hole 22a against a biasing force. The grip main body 2 is then rotated by a biasing force of the twisted coil spring 5 to a non-use state (storage position) arranged along the body panel 10 as shown by solid lines in FIGS. 3(a) and 3(b).

In contrast, the storage section 35a has a shape of a notch between the overhanging sections 33, and the damper 6 is arranged between the overhanging sections 33. The connection sections 35b and 35c are provided on facing inner surfaces of each of the overhanging sections 33. The damper 6 is incorporated into the storage section 35a in a state where the opening 8a on one end of the outer cylinder rotatably is engaged with the connection section 35b having a convex shape and the closed end section 9a of the inner cylinder is engaged with and fixed to the connection section 35c having a concave shape.

The above holding members 3 and 3A are arranged in the recessed section 22 of the grip main body end section 21, and pivotally supported by the pivot 36 in a rotatable manner. This pivotal support structure will be described in detail in important sections of the first form. In FIGS. 3(a) and 3(b), the assist grip 15 has the grip main body 2 operated to be rotated against a biasing force of the coil spring 5 from the storage position shown by a solid line to the use position shown by a dashed line, and rotated again to the storage position by a biasing force of the twisted coil spring 5 when a hand is released at the use position. In this state, the grip main body 2 is rotated while keeping a state where one of step sections 22b and 22c constituting the damper abuts onto the projection section 8b or the projection section 8c of the outer cylinder. As a result, the outer cylinder 8 is braked against a fluid resistance and slowly rotated together with the grip main body 2 with respect to the inner cylinder 9.

(Important Sections of First Embodiment and their Functions)

As described above, the guide groove 23 on the inner surface 22A and the guide groove 23 on the inner surface 22B are horizontally symmetrical as shown in FIGS. 5(a), 5(b), 6(a), and 6(b). The guide groove 23 on the inner surface 22A is provided with a bearing hole 24 which is one step deeper and connected to the terminal 23b. The guide groove 23 on the inner surface 22B is not provided with such a bearing hole which is one step deeper; however, a location of the end section 23b formed by the elastic locking piece 25 described later also functions as a bearing hole 24a. For this reason, in the guide groove 23 on the inner surface 22B, the terminal 23b of the guide groove in a location bent from the guide groove 23a is formed to be longer than the terminal 23b of the guide groove 23 on the inner surface 22A by a length corresponding to the bearing hole 24. In FIGS. 5 and 6, the bearing hole 24 provided on the inner surface 22A and the bearing hole 24a provided on the inner surface 22B which is positioned at the terminal 23b of the guide groove 23 and formed by the elastic locking piece 25 are positioned on a coaxial line.

In this structure, as shown in diagrams FIGS. 5(a), 6(a), 9(a), 10(a) and 11(a), a width X between the inner surface 22A and the inner surface 22B can be widened. That is, the inner surface 22A and the inner surface 22B are formed to be easily displaced in a direction in which the width X is widened by existence of the guide groove 23 and an underfill section, like a slit-shaped empty section 26 described later. For this reason, in this structure, the retainer 1 is mounted on the grip main body 2 by widening the width X by inserting the pivot 36 corresponding to the guide groove 23 formed at least on either one of the inner surfaces 22A and 22B, fitting a first one of the pivots 36 to the bearing hole 24 and a second one of the pivots 36 to the bearing hole 24 connected to the terminal 23b of the guide groove as exemplified in FIGS. 9(a) and 9(b), and fitting each of the pivots 36 to a corresponding one of the bearing holes 24 and 24a through the guide groove 23 as exemplified in FIGS. 5(a) and 5(b).

Each of the guide grooves 23 includes the elastic locking piece 25 which allows the pivot 36 to be fitted to the terminal 23b of the guide groove that functions as a bearing hole and/or the bearing hole 24 and locks the pivot 36. The elastic locking piece 25 has a claw 25a which is provided at a front end and protrudes into the guide groove 23 or the guide groove 23a. That is, the elastic locking piece 25 is provided in a location of the terminal 23b of the guide groove as shown on the right side of FIG. 5(b) (where the elastic locking piece 25 forms a location of the terminal 23b of the guide groove as the bearing hole 24a), or in a manner corresponding to the bearing hole 24 as shown on the left side of FIG. 5(b). The elastic locking piece 25 is formed by the slit-shaped empty section 26 from part of a wall section that forms the terminal 23b of the guide groove, and/or part of a wall section that forms the bearing hole 24. The empty section 26 is a slit having a predetermined width which is positioned on a back surface of the elastic locking piece 25 and extends vertically in the storage form of the grip main body 2, and an upper part of the slit communicates with the guide groove 23a.

With respect to the above guide groove 23, the claw 25a of the elastic locking piece, and the pivot 36, there is established a relationship of A<B<C, where A is a groove width minimum dimension obtained by subtracting a protruding amount of the claw 25a from a groove width C of the guide groove 23, B is a diameter dimension of the pivot 36, and C is a groove width dimension of the guide groove 23 as shown on the left side of FIG. 5(b). This configuration is most preferable to allow the pivot 36 to slide smoothly on the guide groove 23 to the terminal 23b, and also to allow the pivot 36 to be engaged with or to be prevented from being removed from the claw 25a of the elastic locking piece.

When the pivot 36 hits an upper side of the locking piece in a process of sliding on the guide groove 23a, stress of the hitting causes the elastic locking piece 25 to swing and be displaced to the terminal 23b of the guide groove and/or the bearing hole 24 side. When the pivot 36 hits the upper side of the locking piece in a process of moving from the guide groove 23a to the terminal 23b, stress of the hitting causes the elastic locking piece 25 to swing and be displaced to the slit-like empty section 26 side. In this structure, the above functions distribute and absorb local stress received from the pivot 36 so that excellent sliding of the pivot 36 is easily maintained. As a result, assemble ability can be improved as compared to conventional configurations.

Figure 7A:
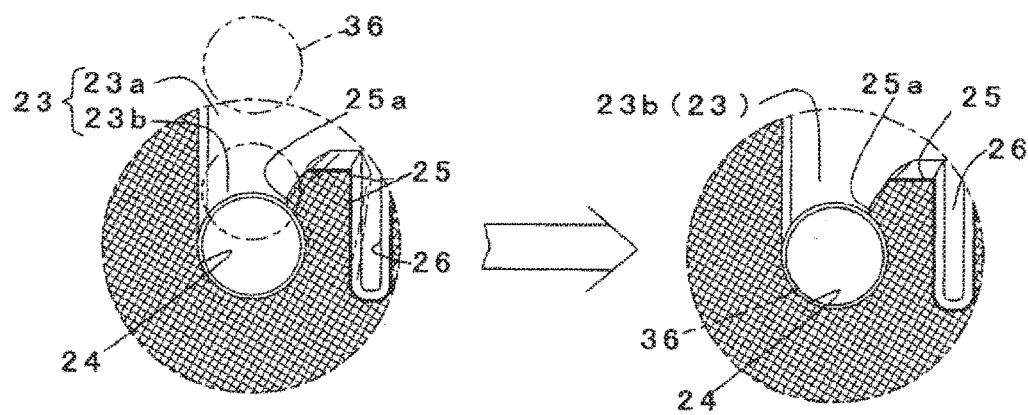
FIG. 7(a) is a schematic diagram showing operation of an elastic locking piece shown in FIG. 4(c), FIG. 5(b), and FIG. 6(b) and a cross-sectional view cut along line G-G and line G1-G1 of FIG. 4(a).

FIG. 7(a) shows a process in which the pivot 36 is fitted to the bearing hole 24 from a terminal 36b of the guide groove. In this process, the elastic locking piece 25 is pressed by the pivot 36 and swings and is displaced to the empty section 36 side as shown in the left diagram, and the pivot 36 passes over the claw 25a and is fitted to the bearing hole 24. In synchronization with the fitting, the elastic locking piece 25 returns to the original state and ensures that the fitting of the pivot 36 is prevented from being released with the claw 25a as shown in the right diagram. This point similarly applies to the bearing hole 24a using the terminal 36b of the guide groove as shown on the right side of FIG. 5(b). In other words, this structure achieves a pivotal support structure in which the pivot 36 is locked with the claw 25a so as not to be removed easily.

Figure 6A:
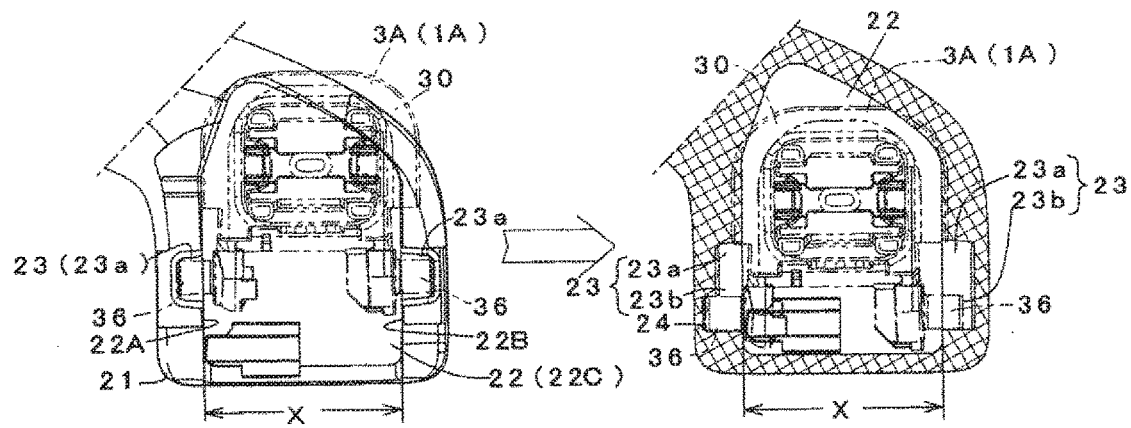
FIG. 6(a) is a schematic diagram showing a relationship between a second recessed section of the grip main body and the retainer, in which the left side shows a portion enclosed by a chain double-dashed line and attached with a reference sign b in FIG. 4(a), and the right side shows a cross-sectional view cut along line D1-D1 in FIG. 4(b).
Figure 6B:
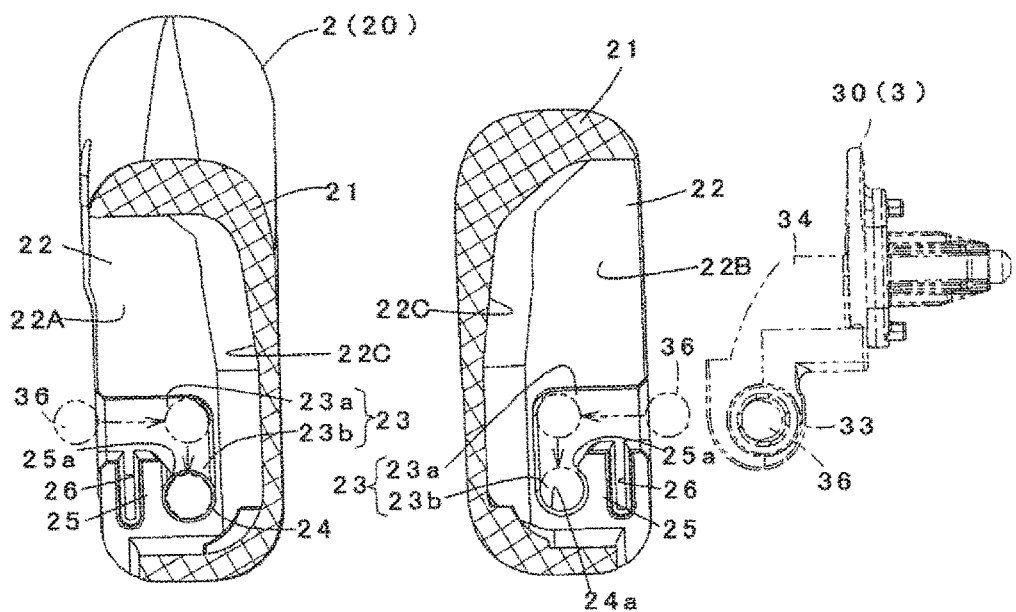
FIG. 6(b) is a schematic diagram showing a relationship between the guide grooves on both inner surfaces of the second recessed section and each pivot of the retainer, in which the left side shows a cross-sectional view cut along line F1-F1 of FIG. 4(a) and the right side shows a cross-sectional view cut along line E1-E1 of FIG. 4(a).

Further, in the above configuration, as estimated from FIGS. 3(b) and 6(b), the guide groove 23 includes, at the storage position of the clip main body 2, the introduction groove 23a that extends from an opening edge of the recessed section 22 to the inner bottom surface 22C side in a substantially horizontal manner, and the terminal 23b that is positioned at a location that is bent downward from the introduction groove 23a. Since the configuration is such that, in the use position of the grip main body 2, a load applied to the pivot 36 is received by the terminal 23b of the guide groove in a substantially horizontal state, that is, the bearing hole 24a and/or the bearing hole 24, load bearing can be improved.

(First and Second Variations)

Figure 8A:
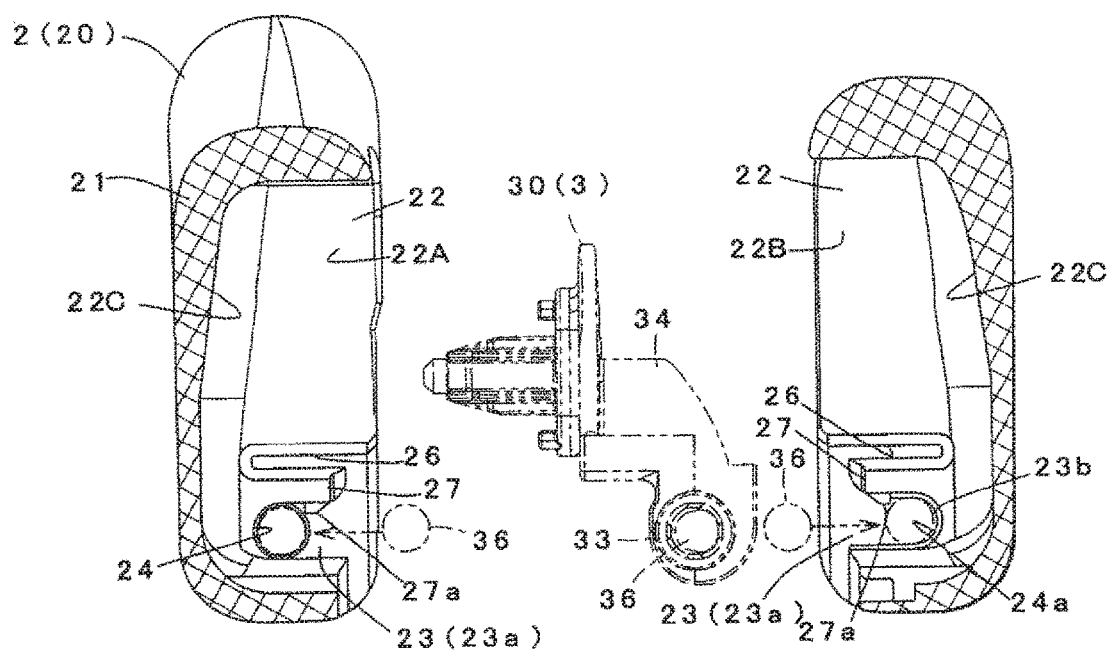
FIGS. 8(a) and 8(b) are schematic diagrams showing first and second variations in which a shape of the elastic locking piece is changed, in a manner corresponding to FIG. 5(b), where the left side of each of the diagrams is a diagram corresponding to a cross-sectional view cut along line F-F of FIG. 4(a) and the right side of each of the diagrams is a diagram corresponding to a cross-sectional view cut along line E-E of FIG. 4(a).
Figure 8B:
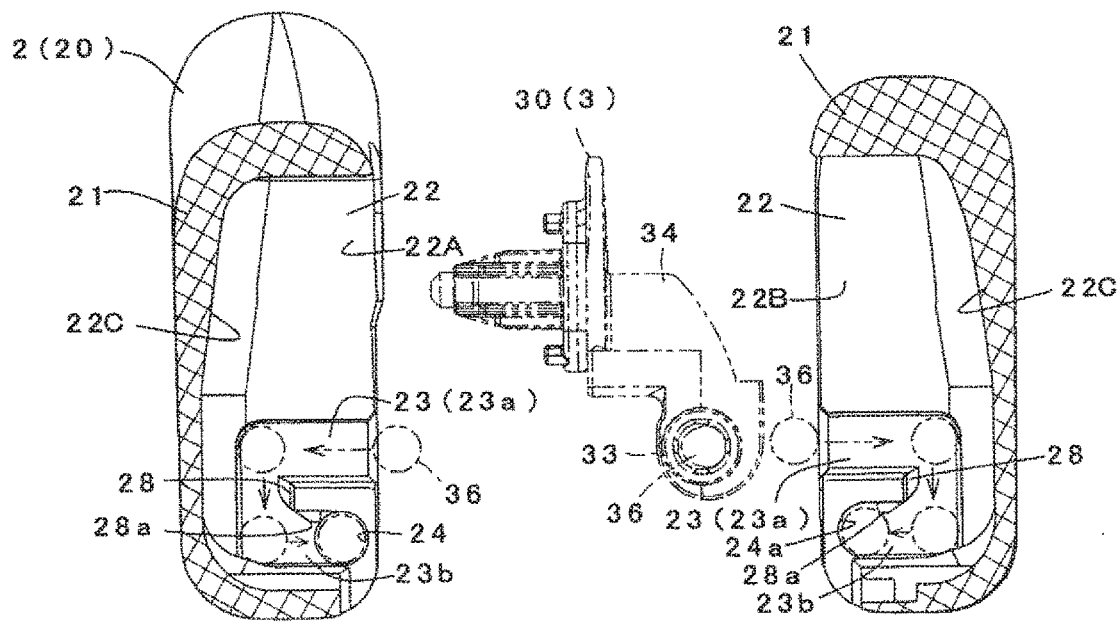

FIGS. 8(a) and 8(b) show two embodiments in which the configuration of the above elastic locking piece 25 is changed in a manner corresponding to FIG. 5(b). In each of the variations, the same reference signs are attached to locations which are the same as or similar to those in the above first form, and duplicate description will be omitted as much as possible.

In the first variation of FIG. 8(a), each of the guide grooves 23 is substantially linear, and is formed with the introduction groove 23a that extends from an opening edge of the recessed section to the inner bottom surface 22C side in the recessed section. That is, the bearing hole 24 is provided on a deeper side of the guide groove 23a in the guide groove 23 on the inner surface 22A. Although the guide groove 23 on the inner surface 22B is not provided with such a bearing hole, the terminal 23b, that is, the terminal 23b that also functions as the bearing hole 24a, is positioned on a deeper side of the introduction groove 23a. Accordingly, the introduction groove 23a on the inner surface 22B is formed to be longer than the introduction groove 23a on the inner surface 22A by a length corresponding to the bearing hole 24. In other words, the bearing hole 24 provided on the inner surface 22A and the bearing hole 24a which is positioned at the terminal 23b of the guide groove provided on the inner surface 22B and formed by an elastic locking piece 27 described later are positioned on a coaxial line.

Each of the guide grooves 23 includes the elastic locking piece 27 that allows the pivot 36 to be fitted to the bearing hole 24 or the terminal 23b of the guide groove (the terminal 23b that also functions as the bearing hole 24a) and locks the pivot 36. The elastic locking piece 27 includes a claw 27a that is provided at a front end and protrudes into the introduction groove 23a. The elastic locking piece 27 is provided to correspond to a location of the terminal 23b as shown on the right side of FIG. 8(a) or the bearing hole 24 as shown on the left side of FIG. 8(b), and part of a wall section that forms the guide groove 23 is formed by the empty section 26. The empty section 26 is in a different direction relative to that in the first form, and is a slit having a predetermined width that is on a back side of the elastic locking piece 27 and extends substantially horizontally in the storage form of the grip main body 2.

In the above structure, when the holding member 3 is connected to and pivotally supported by the recessed section 22, the elastic locking piece 27 is pressed by the pivot 36 and swings and is displaced to the empty section 26 side as shown in the left diagram of FIG. 8(a), and the pivot 36 passes over the claw 27a and is fitted to the bearing hole 24. When, as shown in the right diagram of FIG. 8(a), the pivot 36 hits the claw 27a in a process of moving from the introduction groove 23a to the bearing hole 24a using the terminal 23b, and stress of the hitting causes the elastic locking piece 27 to swing and be displaced to the empty section 26 side. In this structure, the above functions allow local stress received from the pivot 36 to be distributed and absorbed, and excellent sliding of the pivot 36 can be easily maintained. As a result, assemble ability can be improved as compared to conventional configurations. That is, each of the elastic locking pieces 27 returns to the original state as shown in each diagram, and ensures that the pivot 36 is prevented from being unexpectedly released from fitting with the claw 27a. In other words, this structure also achieves the pivotal supporting structure in which the pivot 36 is locked by the claw 27a and prevented from being removed easily.

In the second variation of FIG. 8(b), each of the guide grooves 23 has a substantially U-shape, extends from the opening edge of the recessed section to the inner bottom surface 22C side of the recessed section, and also includes the introduction groove 23a in different directions and the terminal 23b. The inner surface 22A is provided with the bearing hole 24 communicating with the terminal 23b, while the inner surface 22B is not provided with such a bearing hole. However, the guide groove 23 on the inner surface 22B is formed to be longer than the guide groove 23 on the inner surface 22A by a length corresponding to the bearing hole 24. The longer part terminal 23b is the bearing hole 24a formed by the elastic locking piece 27. In other words, the bearing hole 24 provided on the inner surface 22A and the bearing hole 24a provided on the inner surface 22B and using the terminal 23b of the guide groove are positioned on a coaxial line.

Each of the guide grooves 23 also includes an elastic locking piece 28 that allows the pivot 36 to be fitted to the bearing hole 24 or the bearing hole 24a using the terminal 23b of the guide groove and locks the pivot 36. The elastic locking piece 28 includes a claw 28a that is provided at a front end and protrudes into the terminal 23b. The elastic locking piece 28 is formed by the guide groove 23 having a substantially U-shape.

In the above structure, when the holding member 3 is connected to and pivotally supported by the recessed section 22, the elastic locking piece 28 is pressed by the pivot 36 and swings and is displaced as shown in the left diagram of FIG. 8(b), and the pivot 36 passes over the claw 27a and is fitted to the bearing hole 24. When, as shown in the right diagram of FIG. 8(b), the pivot 36 hits the claw 28a in a process of moving from the introduction groove 23a to the bearing hole 24a using the terminal 23b, and stress of the hitting causes the elastic locking piece 28 to swing and be displaced. In this structure, the above functions allow local stress received from the pivot 36 to be distributed and absorbed, and excellent sliding of the pivot 36 is easily maintained. As a result, assemble ability can be improved as compared to conventional configurations. As a matter of course, the elastic locking piece 28 in this structure also returns to the original state as shown in FIG. 8(b), and the claw 28a ensures that the pivot 36 is prevented from being unpreparedly released from fitting.

(Third Variation)

Figure 9A:
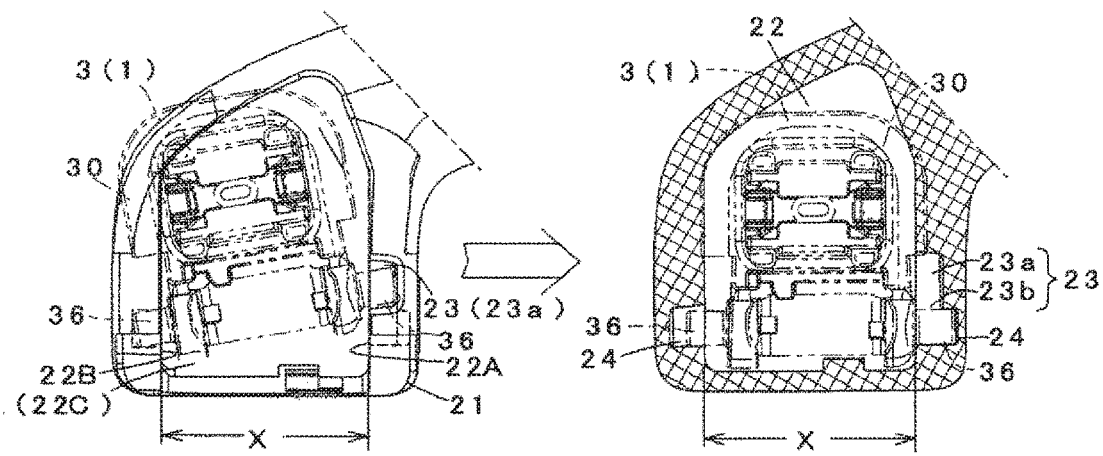
FIGS. 9(a) and 9(b) are schematic diagrams showing a third variation, in which the guide groove is formed only on one of the inner surfaces shown in FIGS. 5(a) and 5(b) in a manner corresponding to FIG. 5(a), in which the left side of FIG. 9(a) shows a portion enclosed by a chain double-dashed line and attached with a reference sign a in FIG. 4(a) and the right side shows a cross-sectional view cut along line D-D of FIG. 4(b), and the left side of FIG. 9(b) is a cross-sectional view cut along line F-F of FIG. 4(a) and the right side is a cross-sectional view cut along line E-E of FIG. 4(a).
Figure 9B:
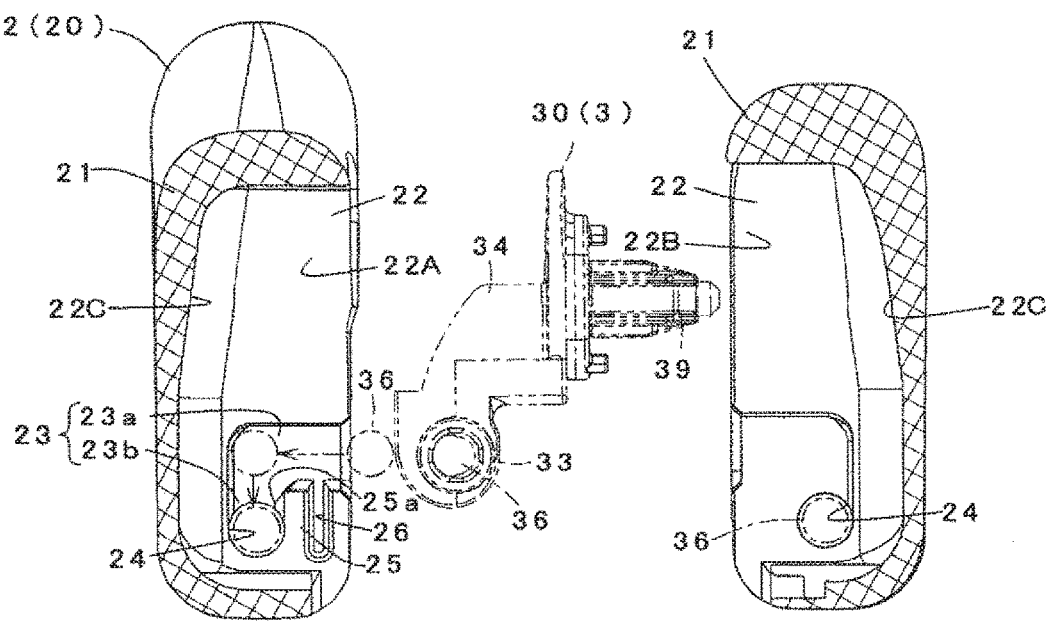

As a third variation in FIGS. 9(a) and 9(b), an embodiment where the guide groove 23 is provided only on the inner surface 22A is shown in a manner corresponding to FIGS. 5(a) and 5(b). In this third variation as well, the same reference signs are attached to locations which are the same as or similar to those in the first form, and duplicate description will be omitted as much as possible.

In the third variation, the inner surface 22A is provided with the guide groove 23, the bearing hole 24, and the elastic locking piece 25, like FIGS. 5(a) and 5(b). However, the inner surface 22B is provided only with the bearing hole 24 and the elastic locking piece 27 is omitted. In the above structure, when the holding member 3 is connected to and pivotally supported by the recessed section 22, in a state where a first one of the pivots 36 is fitted to the bearing hole 24 on the inner surface side 22B as shown in a left diagram of FIG. 5(a), a second one of the pivots 36 is allowed to be fitted to the bearing hole 24 from the introduction groove 23a as the guide groove on the inner surface 22A after passing over the terminal 23b and the claw 25a. In this case, the width X is widened by the insertion of the pivot 36 corresponding to the guide groove 23 formed at least on either one of the inner surfaces 22A and 22B, and each of the pivots 36 is fitted to the corresponding one of the bearing holes 24. In this case, when the pivot 36 hits the claw 25a in a process of moving from the introduction groove 23a to the terminal 23b, stress of the hitting causes the elastic locking piece 25 to swing and be displaced, and allow the pivot 36 to be fitted to the bearing hole 24. In this structure, the above functions allow local stress received from the pivot 36 to be distributed and absorbed so that excellent sliding of the pivot 36 can be easily maintained, and assemble ability can be improved as compared to conventional configurations. As a matter of course, in this structure as well, the elastic locking piece 25 returns to the original state as shown in the diagram, and ensures that the pivot 36 is prevented from being unpreparedly leased from fitting with the claw 25a.

(Important Sections of Second Form and their Functions)

Figure 10A:
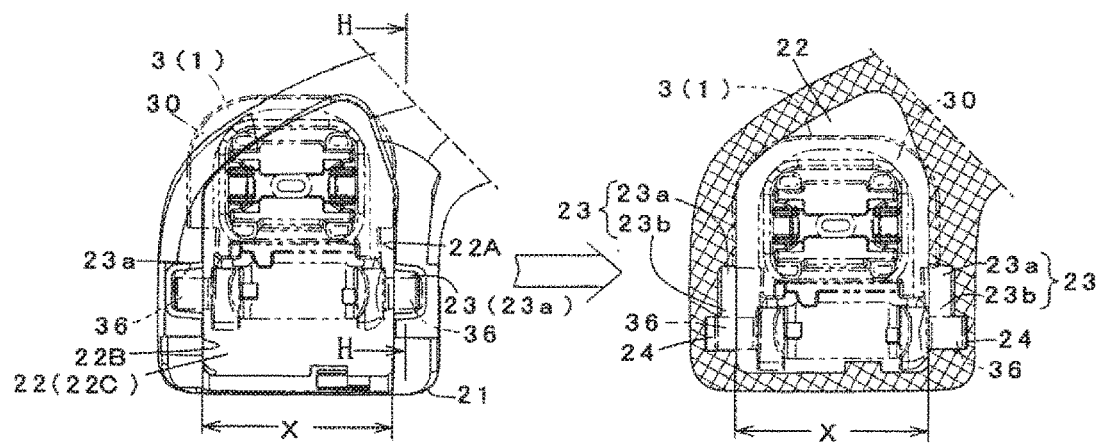
FIGS. 10(a) and 10(b) are schematic diagrams showing important sections of a second form in a manner corresponding to FIGS. 5(a) and 5(b), in which the left side of FIG. 10(a) shows a portion enclosed by a chain double-dashed line and attached with a reference sign a in FIG. 4(a) and the right side shows a cross-sectional view cut along line D-D of FIG. 4(b), and the left side of FIG. 9(b) is a cross-sectional view cut along line F-F of FIG. 4(a) and the right side is a cross-sectional view cut along line E-E of FIG. 4(a).
Figure 10B:
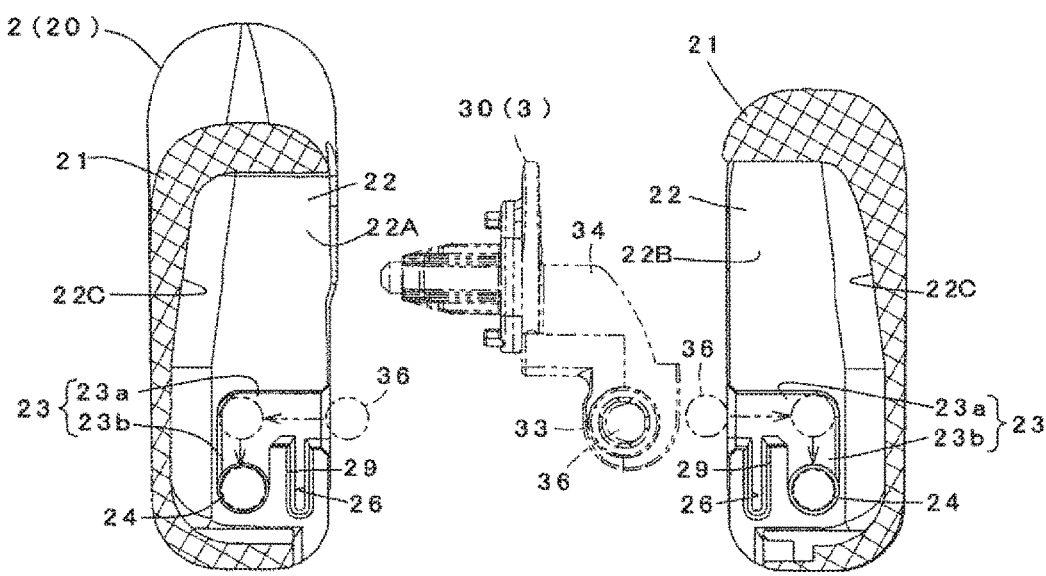

FIGS. 10(a) and 10(b) show important sections of the second form in a manner corresponding to FIGS. 5(a) and 5(b). In the description of the second form as well, the same reference signs are attached to locations which are the same as or similar to those in the first form, and duplicate description will be omitted as much as possible. The second form shows an embodiment in which the elastic locking piece 25 attached with the claw 25a is formed as a groove width widening section 29 without a claw.

The inner surfaces 22A and 22B are formed to be easily displaced in a direction of widening the width X due to existence of the guide groove 23 and notch sections like the slit-like empty section 26 described later. For this reason, in this structure as well, the width X is widened by insertion of the pivot 36 corresponding to the guide groove 23 formed at least on either one of the inner surfaces 22A and 22B, and each of the pivots 36 is fitted to the corresponding one of the bearing holes 24 as shown in FIGS. 10(a) and 10(b), so that the retainers 1 and 1A are mounted on the grip main body 2. In this structure, the guide groove 23 on the inner surface 22A and the guide groove 23 on the inner surface 22B are horizontally symmetrical with respect to the recessed section 22. The bearing holes 24 communicating with the terminals 23b are provided in the guide grooves 23 on the inner surfaces 22A and 22B on a coaxial line. Each of the guide grooves 23 includes the introduction groove 23a extending from an opening edge of the recessed section 22 to the inner bottom surface 22C side, the terminal 23b of the guide groove positioned in a location bent from the introduction groove 23a, and the bearing hole 24 connected to the terminal 23b.

In addition to the above, the guide groove 23 includes the groove width widening section 29 that is provided so that a groove width of the guide groove 23 can be widened, and can be displaced in a direction of widening the groove width when the pivot 36 is slid along the guide groove 23 and when the pivot 36 is fitted to the bearing hole 24. The groove width widening section 29 is provided in a manner corresponding to the bearing hole 24, and is formed by the slit-like empty section 26 on part of a wall section that forms a latter half of the introduction groove 23a and a section around the terminal 23b, and/or part of a wall section that forms the bearing hole 24. The empty section 26 is a slit that is on a back side of the elastic locking piece 27 and extends vertically in the storage form of the grip main body 2, and an upper part of the slit communicates with the introduction groove 23a.

Figure 7B:
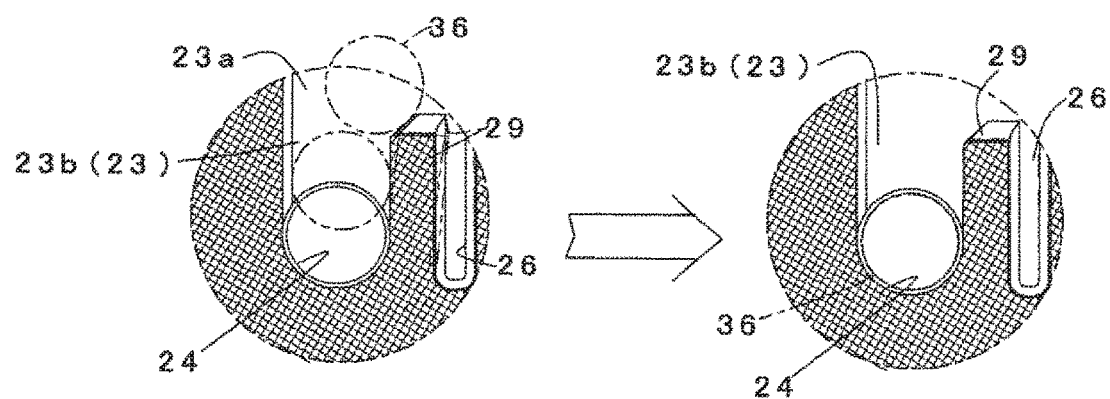
FIG. 7(b) is a schematic diagram showing operation of a groove width widening section shown in FIGS. 10(b) and 11(b), and a cross-sectional view cut along line H-H of FIG. 10(a).

In other words, the above groove width widening section 29 has an upper part formed by the introduction groove 23a and both sides formed by the terminal 23b, the bearing hole 24, and the empty section 26 in the storage form of the grip main body 2. For this reason, as exemplified in FIG. 7(b), the groove width widening section 29 distributes and absorbs local stress by being displaced in a direction of widening a groove width even when the pivots 36 on both sides of the retainer are operated to slide in a manner biased on the left and right in a process where the pivots 36 are slid from an initial form, in which the pivots 36 are fitted to an entrance of the guide groove 23 or the introduction groove 23a, to the terminal 36b of the guide groove. In this manner, excellent sliding of the pivots 36 is easily maintained.

Accordingly, in this structure, assemblability can be improved, and excellent operation can be maintained even when automatic assembly using a robot is performed. Due to the existence of the groove width widening section 29, a groove width of the guide groove 23 with respect to the pivot 36 is made somewhat smaller. In this manner, a structure in which the pivot 36 is not easily removed from the guide groove 23 can be achieved.

(Fourth Variation)

Figure 11A:
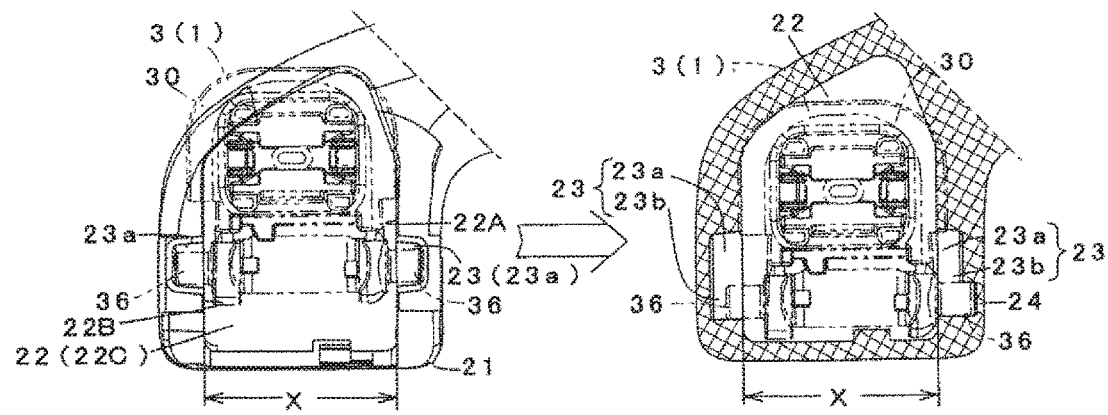
FIGS. 11(a) and 11(b) are schematic diagrams showing a fourth variation, in which one of the groove width widening sections shown in FIG. 10(a) is changed, in a manner corresponding to FIGS. 10(a) and 10(b), in which the left side of FIG. 11(a) shows a portion enclosed by a chain double-dashed line and attached with a reference sign a in FIG. 4(a) and the right side shows a cross-sectional view cut along line D-D of FIG. 4(b), and the left side of FIG. 11(b) is a cross-sectional view cut along line F-F of FIG. 4(a) and the right side is a cross-sectional view cut along line E-E of FIG. 4(a).
Figure 11B:
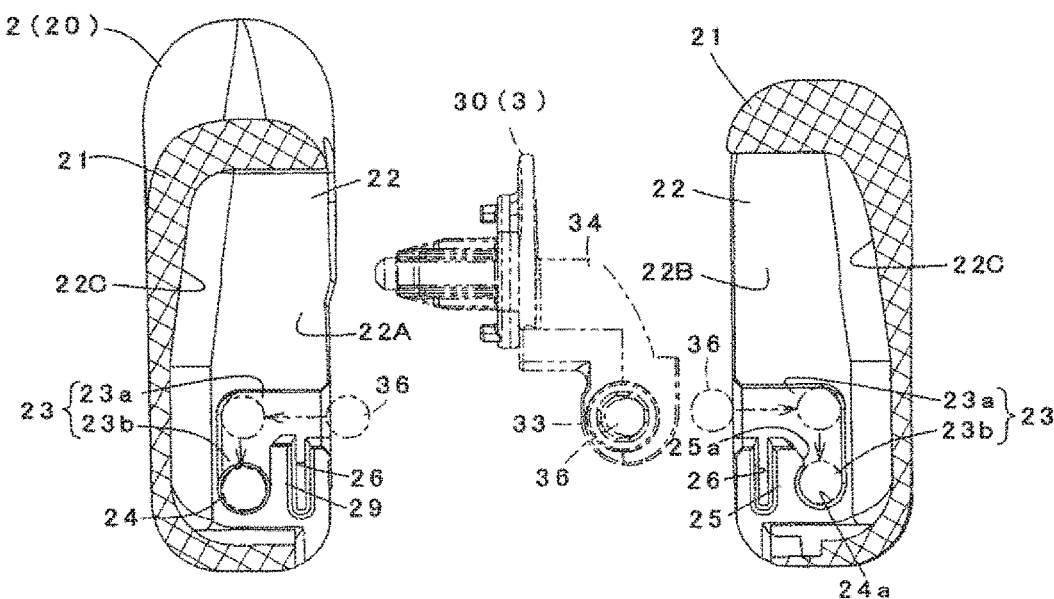
Figure 12A:
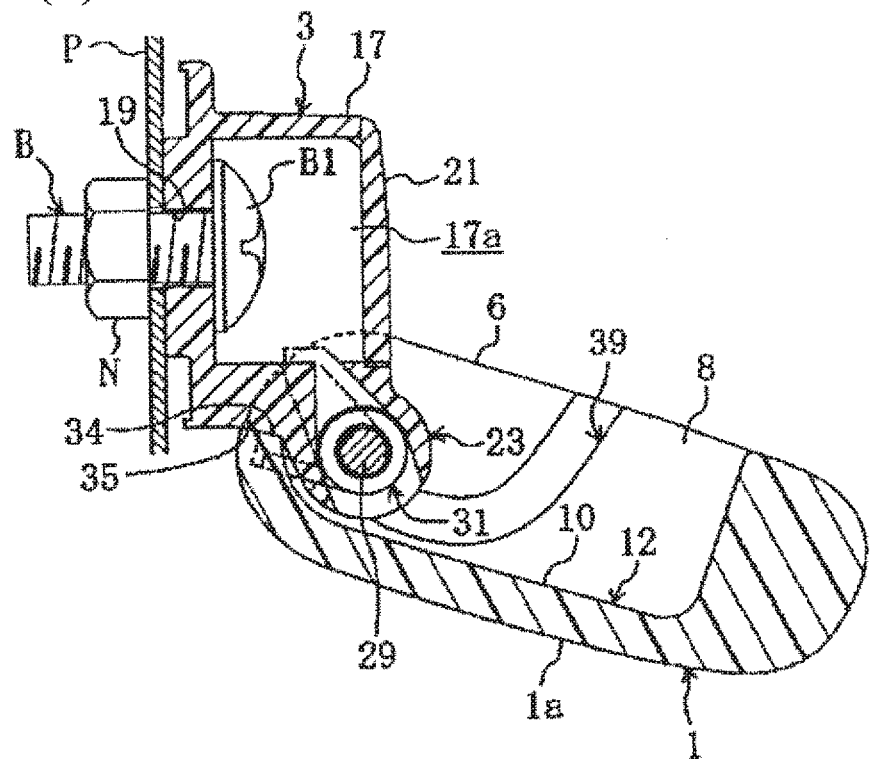
FIG. 12(a) shows FIG. 2 of Patent Literature 1.
Figure 12B:
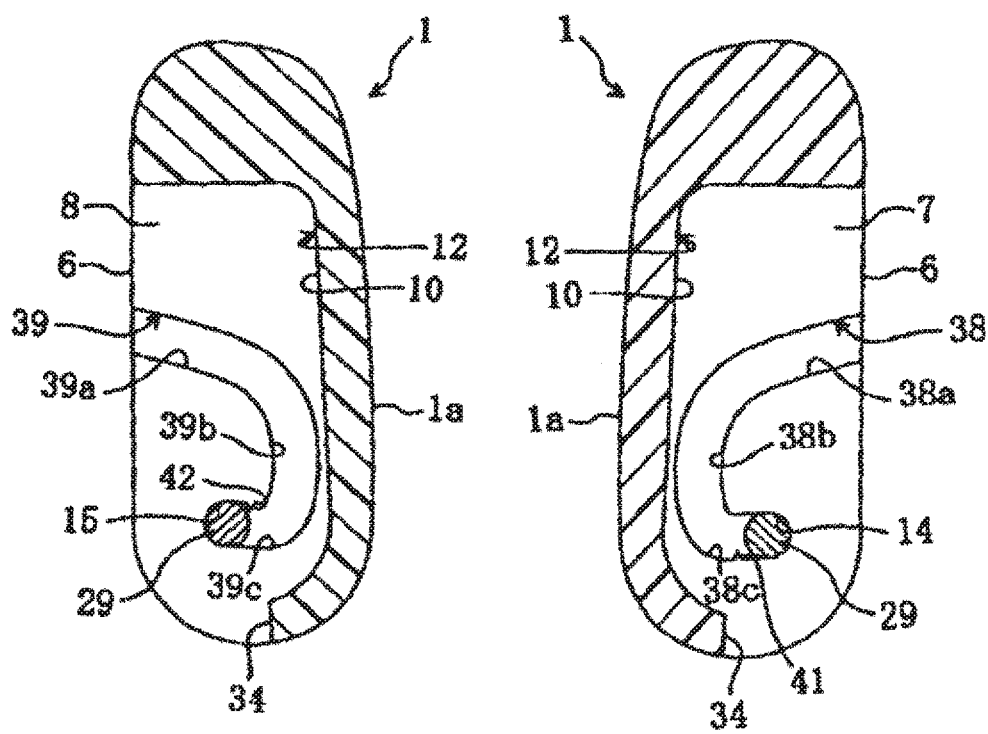
FIG. 12(b) is an explanatory view showing FIGS. 5 and 6 of Literature 1.
Figure 13:
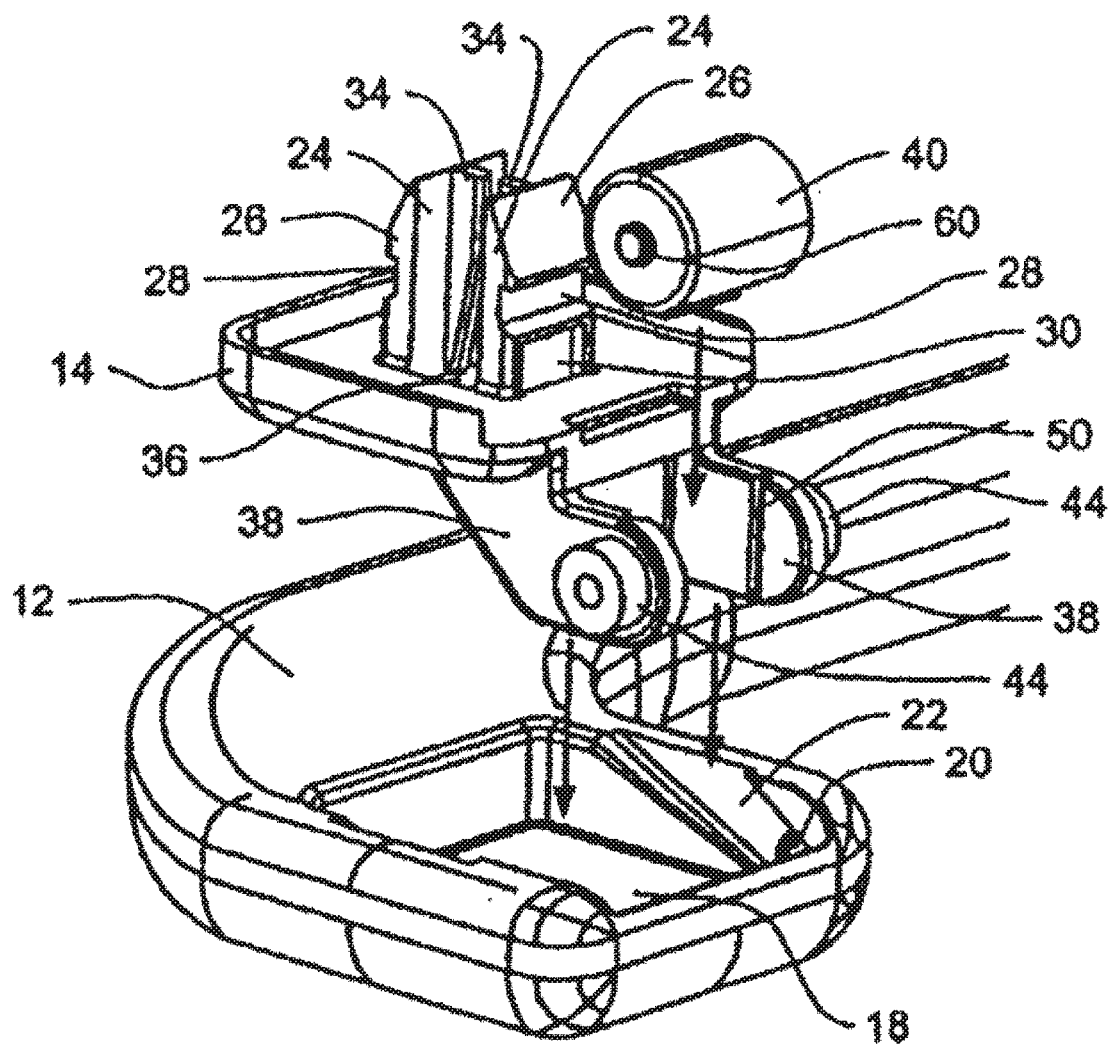
FIG. 13 is an explanatory view showing FIG. 6 of Patent Literature 2.

In a fourth variation in FIGS. 11(a) and 11(b), an embodiment in which the groove width widening section 29 is provided only in the guide groove 23 on the inner surface 22A and the above elastic locking piece 25 is provided in the guide groove 23 on the inner surface 22B in a manner corresponding to FIGS. 5(a) and 5(b). In this fourth variation as well, locations which are the same as or similar to those in the above second form are attached with the same reference signs and duplicate description will be omitted as much as possible.

In the fourth variation, the guide groove 23 on the inner surface 22A and the guide groove 23 on the inner surface 22B are substantially horizontally symmetrical. Although the bearing hole 24 connected to the terminal 23b is provided in the guide groove 23 on the inner surface 22A, the guide groove 23 on the inner surface 22B is not provided with such a bearing hole. However, in the guide groove 23 on the inner surface 22B, the terminal 23b of the guide groove which is located in a location bent from the introduction groove 23a is formed to be longer than the terminal 23b of the guide groove 23 on the inner surface 22A by a length corresponding to the bearing hole 24, and the longer location is the bearing hole 24a formed by the elastic locking piece 25. In other words, the bearing hole 24 provided on the inner surface 22A and the bearing hole 24a that is provided on the inner surface 22B and uses the terminal 23b of the guide groove are positioned on a coaxial line.

The guide groove 23 on the inner surface 22A is provided with the groove width widening section 29 which is the same as that in FIGS. 10(a) and 10(b). The guide groove 23 on the inner surface 22B is provided with the elastic locking piece 25 which is the same as that in FIGS. 5(a) and 5(b). For this reason, this structure has the functions and advantages of the groove width widening section 29 and the elastic locking piece 25 described above.

The assist grip of the present invention only needs to include the configuration specified in a main claim of the present application, and detailed sections can be further developed with reference to the embodiments and variations. As an example, the clip 4 is omitted, the leg section 39 is formed into an engageable shape, and the leg section itself is engaged with and fixed to, that is, fastened with, the mounting hole 10a of the panel.

In the storage form of the grip main body 2, the groove width widening section 29 may have a shape which is long in a horizontal direction like the elastic locking piece 28 of FIG. 8(b), and may be displaced to the introduction groove 23a side on an upper side, or deformed to the side of the end section 23b of the guide groove and the bearing hole 24 on a lower side, in place of the configurations of FIGS. 10(a) and 10(b).

REFERENCE SIGNS LIST 1, 1A: Retainer
2: Grip main body (20: Holding section, 21: End in longitudinal direction)
3, 3A: Holding member (30: Board, 34: Support section, 39: Leg section)
4: Clip (Fixed section, 40: Plate section, 41: Connection section,
43: Engaging claw)
5: Coil spring
6: Damper (8: Outer cylinder, 9: Inner cylinder)
7: Cover
10: Panel
15: Assist grip
22: Recessed section (22A, 22B: Inner surface, 22C: Inner bottom surface)
23: Guide groove (23a: Introduction groove, 23b: Terminal)
24: Bearing hole
24a: Bearing hole
25: Elastic locking piece (25a: Claw)
26: Empty section
27: Elastic locking piece (27a: Claw)
28: Elastic locking piece (28a: Claw)
29: Groove width widening section
36: Pivot (journaling section)

The entire content of description, claims, drawings, and abstract of JP 2015-122737 filed on Jun. 18, 2015 is cited herein, and incorporated as disclosure of the description of the present invention.

The invention claimed is:

1. An assist grip comprising:
a retainer including a fixed section configured to be fixed to a mounting surface of a panel, and a pair of journaling sections; and
a grip main body including a pair of recessed sections provided on two ends in a longitudinal direction, a guide groove formed at least on one of inner surfaces facing each other in a longitudinal direction among inner surfaces of the recessed section, one of the journaling sections being slidable on the guide groove, and bearing holes provided on a coaxial line on both of the inner surfaces, the grip main body being rotated with the journaling sections as a fulcrum to be switched between a storage position of the grip main body along the mounting surface and a use position of the grip main body protruding from the mounting surface,
wherein the guide groove extends from an opening edge of the recessed section to an inner bottom surface side, and at least one of the bearing holes on both of the inner surfaces includes an elastic locking piece that is positioned at a terminal of the guide groove or one of the bearing holes and allows fitting of an end section of one of the journaling sections.

2. The assist grip according to claim 1, wherein when the guide groove extends from the opening edge of the recessed section to the inner bottom surface side, and at least one of bearing holes of both of the inner surfaces has the elastic locking piece that is positioned at the terminal of the guide groove or the bearing hole and allows fitting of the end section of the journaling section, the elastic locking piece includes a claw that protrudes from a front end thereof and prevents removal, and the claw is switched between a fitting state and a fitting released state with swinging of the elastic locking piece.

3. The assist grip according to claim 1, wherein the elastic locking piece is one formed by a slit empty section on part of a wall section that forms a section around the terminal of the guide groove and/or the bearing hole, and is swingable to the empty section side.

4. The assist grip according to claim 2, wherein there is established a relationship of A<B<C, where A is a groove width minimum dimension obtained by subtracting a protruding amount of the claw from a groove width of the guide groove, B is a diameter dimension of an end section of the journaling section, and C is a groove width dimension of the guide groove.

5. The assist grip according to claim 1, wherein the guide groove includes, at the storage position of the clip main body, an introduction groove extending from the opening edge of the recessed section to the inner bottom surface side, and a terminal on a front end side of the introduction groove, and at the use position of the grip main body, a load applied to the journaling section is received by the terminal of the guide groove in a substantially horizontal state and/or the bearing hole.

* * * * *